(12) United States Patent
Razdan et al.

(10) Patent No.: US 9,335,494 B2
(45) Date of Patent: May 10, 2016

(54) OPTOELECTRONICS STRUCTURES

(71) Applicant: Tyco Electronics Corporation, Berwyn, PA (US)

(72) Inventors: Sandeep Razdan, Millbrae, CA (US); Jibin Sun, Mountain View, CA (US); Haipeng Zhang, Santa Clara, CA (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 14/278,588

(22) Filed: May 15, 2014

(65) Prior Publication Data

US 2015/0331204 A1    Nov. 19, 2015

(51) Int. Cl.
*G02B 6/36*    (2006.01)
*G02B 6/42*    (2006.01)

(52) U.S. Cl.
CPC .............. *G02B 6/4206* (2013.01); *G02B 6/422* (2013.01); *G02B 6/423* (2013.01); *G02B 6/425* (2013.01); *G02B 6/3652* (2013.01); *G02B 6/4202* (2013.01); *G02B 6/4219* (2013.01); *G02B 6/4243* (2013.01); *G02B 6/4245* (2013.01)

(58) Field of Classification Search
CPC .. G02B 6/4292; G02B 6/4246; G02B 6/4249; G02B 6/4214; G02B 6/42; G02B 6/36
USPC ..................................... 385/53, 88, 89, 90, 91
See application file for complete search history.

(56) References Cited

U.S. PATENT DOCUMENTS

| | | |
|---|---|---|
| 5,742,720 A | 4/1998 | Kobayashi et al. |
| 6,456,766 B1 * | 9/2002 | Shaw et al. ............... 385/47 |
| 6,786,651 B2 | 9/2004 | Raj et al. |
| 6,787,812 B2 | 9/2004 | Isaksson |
| 7,476,037 B2 | 1/2009 | Golwalkar et al. |
| 7,723,854 B2 | 5/2010 | Kopp et al. |
| 7,978,940 B2 | 7/2011 | Steijer et al. |
| 8,232,142 B2 | 7/2012 | Steijer et al. |
| 8,412,052 B2 | 4/2013 | Mohammed |

(Continued)

FOREIGN PATENT DOCUMENTS

| | | |
|---|---|---|
| EP | 0614255 A1 | 2/1994 |
| EP | 1864743 A1 | 12/2007 |

(Continued)

OTHER PUBLICATIONS

Nallani et al., "A Method for Improved VCSEL Packaging Using MEMS and Ink-Jet Technologies," Journal of Lightwave Technology, 24(3):1504-1512 (2006).

(Continued)

*Primary Examiner* — Jennifer Doan (57) ABSTRACT

One aspect of the invention provides an optoelectronics structure including: a substrate defining a trench on a first surface; and a VCSEL structure mounted vertically within the trench of the substrate such that the VCSEL structure emits a laser beam substantially parallel to the substrate. Another aspect of the invention provides an optoelectronics structure including: an fiber guiding substrate defining a trench on a first surface; a VCSEL structure mounted vertically within the trench of the fiber guiding substrate such that the VCSEL structure emits a laser beam substantially parallel to the substrate; and an optical fiber mounted on the fiber guiding substrate substantially coaxial with the laser beam emitted by the VCSEL structure.

16 Claims, 9 Drawing Sheets

(56) References Cited

U.S. PATENT DOCUMENTS

| | | |
|---|---|---|
| 8,970,036 B2 | 3/2015 | Raj et al. |
| 2002/0015557 A1 | 2/2002 | Yap et al. |
| 2004/0017977 A1 | 1/2004 | Lam et al. |
| 2004/0022487 A1 | 2/2004 | Nagasaka et al. |
| 2004/0037507 A1 | 2/2004 | Marion et al. |
| 2004/0218874 A1 | 11/2004 | Kondo |
| 2006/0274799 A1* | 12/2006 | Collins et al. ............. 372/38.09 |
| 2007/0036493 A1 | 2/2007 | Brenner et al. |
| 2008/0008419 A1 | 1/2008 | Krahenbuhl et al. |
| 2011/0091168 A1 | 4/2011 | Steijer et al. |
| 2012/0063718 A1 | 3/2012 | Steijer et al. |
| 2012/0106117 A1 | 5/2012 | Sundaram et al. |
| 2013/0107485 A1 | 5/2013 | Raj et al. |
| 2013/0119555 A1 | 5/2013 | Sundaram et al. |
| 2013/0188905 A1 | 7/2013 | Hashiguchi |
| 2014/0029894 A1 | 1/2014 | Bowen |
| 2014/0145328 A1 | 5/2014 | Tummala et al. |
| 2014/0355931 A1 | 12/2014 | Tummala et al. |

FOREIGN PATENT DOCUMENTS

| | | | |
|---|---|---|---|
| KR | 1020090045656 A | | 5/2009 |
| WO | WO 97/02501 A1 | | 1/1997 |
| WO | WO 01/59487 A2 | | 8/2001 |
| WO | WO 03/077001 A1 | | 9/2003 |
| WO | WO 2006/047896 A1 | | 5/2006 |
| WO | 2013/053708 A1 | | 4/2013 |

OTHER PUBLICATIONS

International Search Report and Written Opinion re PCT/US2015/031178, mailed Sep. 8, 2015.

Brusberg, L., et al., 2010, "Glass Carrier Based Packaging Approach Demonstrated on a Parallel Optoelectronic Transceiver Module for PCB Assembling", in Proc. of Electronic Components and Technology Conference, 269-274.

Chou, B. C., et al., 2014, "Modeling, Design, and Demonstration of Ultra-miniaturized and High Efficiency 3D Glass Photonic Modules", in Proc. of Electronic Components and Technology Conference, 1054-1059.

Linehan, T. G., et al., 2014, "Challenges to Consider in Organic Interposer HVM", in Proc. of iNEMI Substrate & Packaging Workshop.

McCann, S. R., 2014, "Experimental and Theoretical Assessment of Thin Glass Panels as Interposers for Microelectronic Packages", In Partial Fulfillment of the Requirements for the Degree Master's of Science in the School of Mechanical Engineering, Georgia Institute of Technology.

McCann, S. R., et al., 2014, "Flip-Chip on Glass (FCOG) Package for Low Warpage", in Proc. of Electronic Components & Technology Conference, 2189-2193.

Oda, T., et al., 2013, "Development of Underfilling Method for Flip Chip Mounted VCSEL", in Proc. of Transactions of The Japan Institute of Electronics Packaging, 6, 63-69.

Schroder, H., et al., "glassPack—A 3D Glass Based Interposer Concept for SiP with Integrated Optical Interconnects", Fraunhofer IZM, 2015.

\* cited by examiner

OPTOELECTRONICS STRUCTURES

BACKGROUND

The current state of the art for VCSEL (vertical-cavity surface-emitting laser) packages, such as transceivers, involves complicated 3-dimensional assembly of VCSELs, integrated circuits (ICs), photodetector chips, and the like including alignment and coupling with stacks of optical elements such as lens arrays, turning mirrors, and fiber ferrules. The current packaging scheme also involves several materials such as optical underfills, adhesives, and thermal interface materials, each of which is poses potential interfacial defects. The current assembly is mostly manual, and thus is time consuming with low throughput.

SUMMARY OF THE INVENTION

One aspect of the invention provides an optoelectronics structure including: a substrate defining a trench on a first surface; and a VCSEL structure mounted vertically within the trench of the substrate such that the VCSEL structure emits a laser beam substantially parallel to the substrate.

This aspect of the invention can have a variety of embodiments. The substrate can include glass or silicon.

The optoelectronics structure can further include an optical fiber mounted on the substrate substantially coaxial with the laser beam emitted by the VCSEL structure. The optoelectronics structure can further include a fiber guide positioned between the optical fiber and the substrate. The optoelectronics structure can further include a lens mounted between and substantially coaxial with a laser-emitting surface of the VCSEL structure and the optical fiber.

The optoelectronics structure can further include a waveguide or lens mounted on a laser-emitting surface of the VCSEL structure. The optoelectronics structure can further include an electrical connection from the VCSEL structure to a second, opposite surface of the substrate.

Another aspect of the invention provides an optoelectronics structure including: an fiber guiding substrate defining a trench on a first surface; a VCSEL structure mounted vertically within the trench of the fiber guiding substrate such that the VCSEL structure emits a laser beam substantially parallel to the substrate; and an optical fiber mounted on the fiber guiding substrate substantially coaxial with the laser beam emitted by the VCSEL structure.

Another aspect of the invention provides an optoelectronics structure including: a substrate defining a trench on a first surface; and a PIN diode structure mounted vertically within the trench of the substrate such that the PIN diode structure receives a light beam substantially parallel to the substrate.

This aspect of the invention can have a variety of embodiments. The substrate can include glass or silicon.

The optoelectronics structure can further include an optical fiber mounted on the substrate substantially coaxial with the PIN diode structure. The optoelectronics structure can further include a fiber guide positioned between the optical fiber and the substrate. The optoelectronics structure can further include a lens mounted between and substantially coaxial with the PIN diode structure and the optical fiber. The optoelectronics structure can further include a waveguide or lens mounted on the optical fiber.

The optoelectronics structure can further include an electrical connection from the PIN diode structure to a second, opposite surface of the substrate.

DESCRIPTION OF THE FIGURES

For a fuller understanding of the nature and desired objects of the present invention, reference is made to the following detailed description taken in conjunction with the figures wherein.

DETAILED DESCRIPTION

Optoelectronic Structures Incorporating VCSELs

Aspects of the invention provide optoelectronics structures including a substrate defining a trench on a first surface and a VCSEL structure mounted vertically within the trench of the substrate such that the VCSEL emits a laser beam substantially parallel to the substrate.

Figure 1:
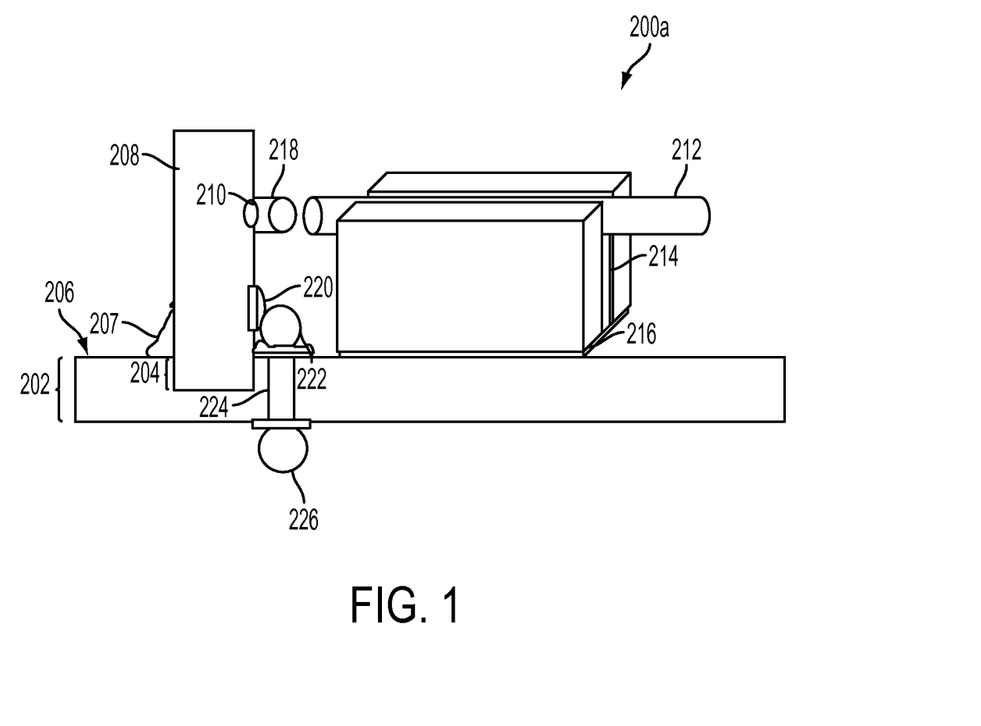
FIG. 1 depicts an optoelectronics structures according to embodiments of the invention.

An exemplary embodiment of such an optoelectronics structure 200a is depicted in FIG. 1.

Substrate 202 can be an insulator such as a glass or silicon interposer. In one embodiment, substrate 202 has a thickness between about 200 µm and about 225 µm. Substrate 202 includes a trench 204 on a first surface 206. Trench 204 can be pre-etched and can have a suitable depth to securely hold a VCSEL structure 208 at a right angle with respect to substrate 202. VCSEL structure 208 can be held in place by mechanical gripping, an interference fit, solder connections, and/or by chemical bonding facilitated by an adhesive 207.

The use of a silicon or glass substrate 202 enables use of standard semiconductor fabrication techniques such as lithography, etching, copper plating, and the like for creating various surface features (such as trenches 204 for VCSEL placement) that enable proper passive alignment.

Figure 2:
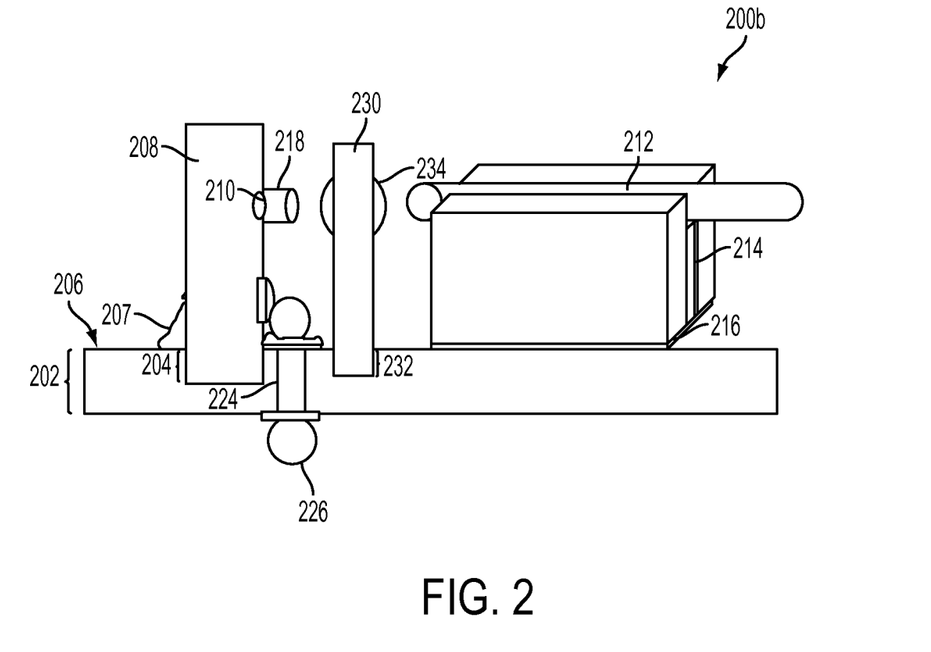
FIG. 2 depicts an optoelectronics structures according to embodiments of the invention.

Adhesive 207 can be applied within trench 204 prior to insertion of VCSEL structure 208 and/or can be applied to the back side of VCSEL structure 208 as depicted in FIGS. 1 and 2. Adhesive 207 can include any material capable of forming a bond with substrate 202 and VCSEL structure 208 and withstanding reflow temperatures. Suitable adhesives include epoxy resins and the like. Adhesives 207 can be cured (e.g., through the application of thermal or UV energy) in accordance manufacturer instructions.

VCSEL structure 208 can be any conventional semiconductor laser diode with laser beam emission perpendicular from a top or bottom surface (as opposed to edge-emitting or in-plane semiconductor lasers). A VCSEL cavity 210 is formed on a top or bottom surface of the VCSEL structure 208.

An optical fiber 212 can be mounted on the substrate 202 to receive a laser beam emitted by the VCSEL structure. Optical fiber 212 can be any known optical fiber, for example, those used in fiber optic communication systems. Optical fiber 212 can have varying diameters such as about 125 μm.

Optical fiber 212 can be coupled to the substrate 202, for example, by a fiber gripper 214. Fiber gripper 214 can be a block (e.g., a silicon block) with etched grooves (e.g., u-shaped or v-shaped grooves) adapted and configured for fiber placement. Fiber gripper 214 can have a sufficient thickness to hold optical fiber 212 in alignment with VCSEL cavity 210. For example, the total thickness of the fiber gripper 214 can be about 259 μm. Fiber gripper 214 can be coupled to substrate 202 with a mechanical fastener (e.g., screws, rivets, and the like) or with a chemical fastener such as an adhesive film 216 (e.g., an adhesive film having a thickness of about 20 μm).

The fiber gripper 214 can also be made of photoresist material such as SU-8 and can be directly deposited on substrate 202 via standard wafer or panel level photolithography techniques.

A waveguide and/or lens 218 can be placed between VCSEL cavity 210 and optical fiber 212 in order to carry, direct, and/or shape the laser beam produced by VCSEL structure 208. Waveguide and/or lens 218 can be formed from a variety of materials such as SU-8. For example, in FIG. 1, a polymer-based pillar is deposited on the VCSEL cavity and a micro-fabricated lens material is deposited on top of the pillar to focus light on to the optical fiber 212.

Figure 3A:
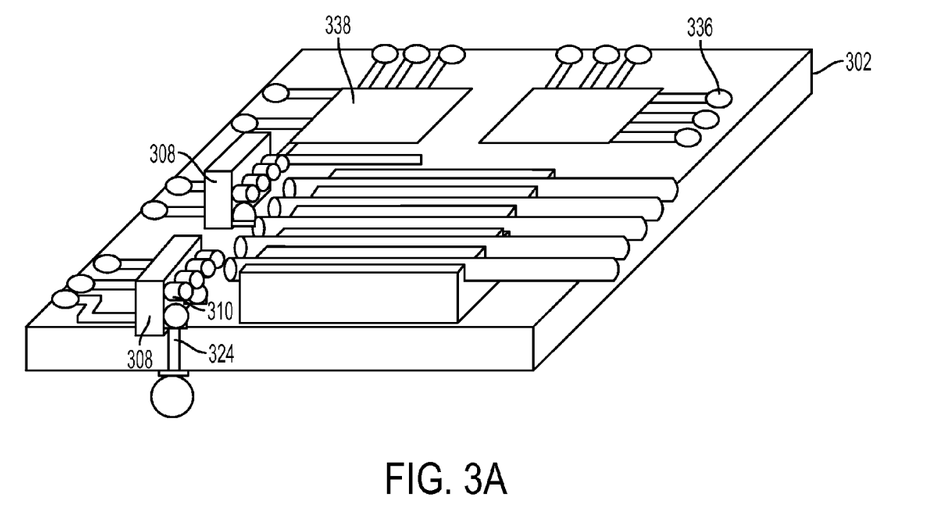
FIGS. 3A-3C depict optoelectronics structures according to embodiments of the invention.

VCSEL structure 208 can be powered and controlled via one or more bond pads 220, which can be coupled (e.g., through solder 222) to a via 224 that can, in turn, be coupled to another component such as a PCB, e.g., through flip chip or wire bonding. Additionally or alternately, the substrate 202 can have plated metal fan-out circuitry 336 that allows it to be wire-bonded to a PCB board (as can be seen in FIG. 3A). Vias 224 can be formed from a conductive material such as a metal (e.g., copper, aluminum, silver, gold, and alloys thereof) and can terminate on either or both sides of substrate 202 in conductive pads (e.g., having a copper or gold surface finish) and can be positioned along the substrate proximate to bond pads 220 of VCSEL structure 208. Solder paste or flux-and-solder balls 222 can be placed on the substrate 202 with the solder ball height determined based on the height of the VCSEL bond pads 220. As seen in FIG. 1, a solder ball 222 between about 100 μm and about 200 μm will be sufficient to initiate good contact with the VCSEL bond pad 220.

Referring now to FIG. 2, in another embodiment of the invention, a further glass substrate 230 can be mounted vertically in substrate 202 between VCSEL structure 208 and optical fiber 212. Glass substrate 230 can be mounted in a trench 232 at a substantially right angle with respect to surface 206 of substrate 202 in the same or similar manner to VCSEL structure 208. Glass substrate 230 can include one or more lenses 234, which can be subwavelength grating (SWG) lenses applied to glass substrate 230 using a variety of techniques such as inkjet printing or thermal reflow.

In still another embodiment, the optical fiber 212 can be directly butt coupled to the VCSEL cavity 210, with a waveguide deposited on top of the VCSEL cavity 210 and the distance between the VCSEL cavity 210 and the optical fiber 212 optimized to take into account any divergence of light from the VCSEL waveguide.

Referring now to FIG. 3A, a slant view of an optical component assembly 300a on a silicon/glass interposer 302 is provided. In addition to the VCSEL structures 308, VCSEL cavities 310, and vias 324 discussed above in the context of FIG. 1, assembly 300 can also include fan-out pads 336 for wirebonding substrate 302 to a PCB and/or a driver/transimpedance amplifier (TIA) 338. Driver/TIA 338 can optionally be assembled separately with a discrete thermal sink and/or thermal solution. Alternatively, driver/TIA 338 could be mounted on the bottom side of silicon/glass interposer 302 and electrically connected to the VCSEL or photodiode chips using electrical vias 324. Mounting driver/TIA 338 chips on the opposite side of substrate 302 advantageously thermally isolates components of assembly.

Figure 3B:
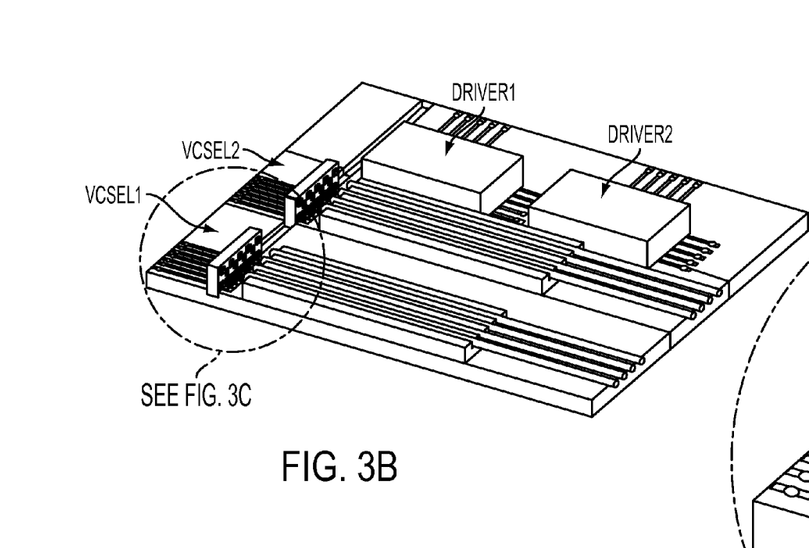
Figure 3C:
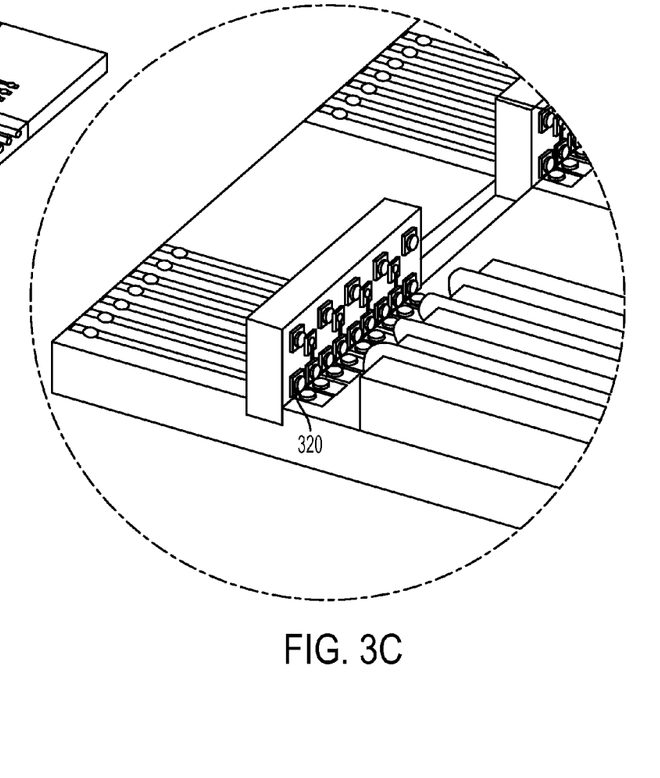

Referring now to FIGS. 3B and 3C, bumps 320 can act as mechanical stops to facilitate the z-height alignment of the VCSEL structure 308.

Optimizable Parameters

Optimal alignment and coupling efficiency can be achieved by controlling one or more parameters during design and manufacturing.

Preferably, trench depth for the VCSEL structure 208, 308 and lens array (if used) can be accurate to within a micron. Suitable etching techniques for achieving such precise depths include photolithographic etching of glass/silicon, deep reactive ion etching, and laser etching.

Fiber gripper thickness and trench depth can also be optimized to control the positioning of optical fibers 212, 312. Suitable etching techniques for achieving such precise depths include photolithographic etching of glass/silicon, deep reactive ion etching, and laser etching. Die attach films are available in 20-30 μm thicknesses and have good uniformity (tolerances between 0.5-1 μm) and can be utilized to mount fiber gripper to substrate 202, 302.

Alignment between the VCSEL cavity, the lens array (deposited or discrete), and the optical fiber array in the z-direction can also be improved by design and control of the efficiency of the lens material (including loss from any waveguide material) and any tilts in VCSEL placement or fiber placement.

Simulated Coupling Performance

Figure 4A:
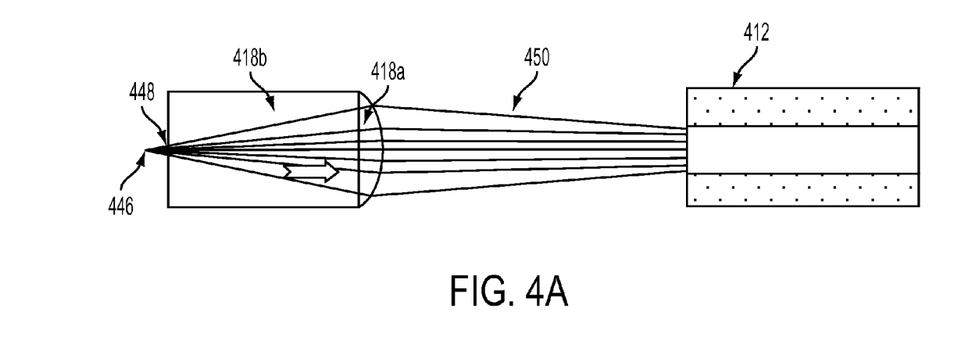
FIGS. 4A and 4B depict the simulated optical coupling performance of a microlens mounted on a glass substrate with a VCSEL structure.
Figure 5A:
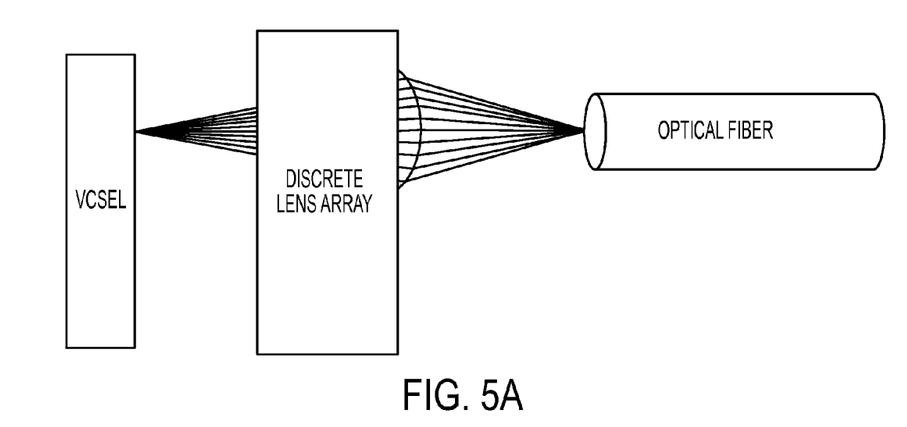
FIGS. 5A and 5B depict the simulated optical coupling performance of a discrete lens array structure aligned with a VCSEL structure.
Figure 5B:
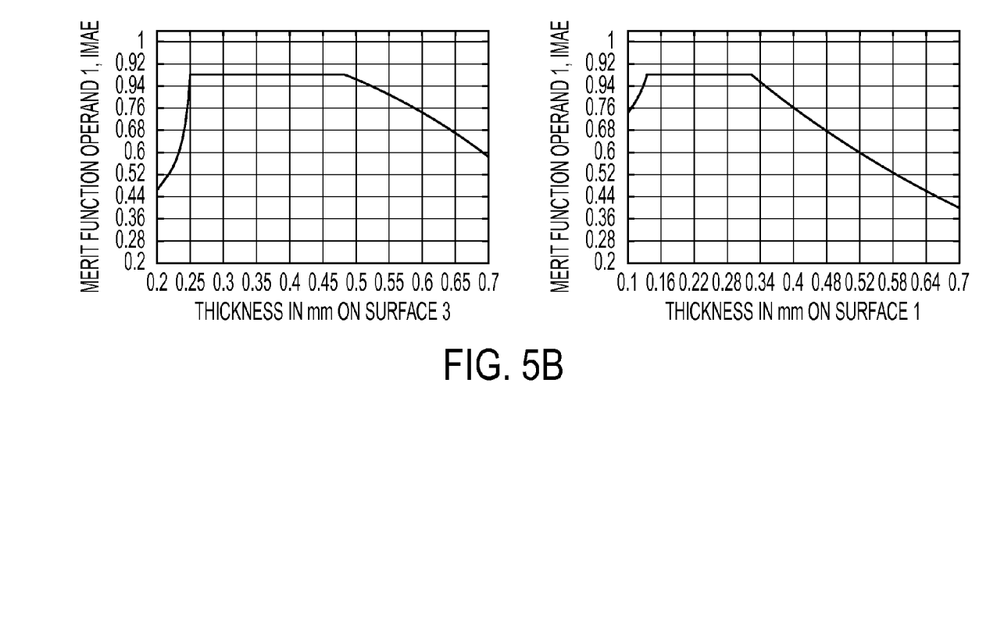

Referring now to FIGS. 4A and 5B, optical simulations were performed using various coupling arrangements. Simulations were performed using software from Zemax, LLC of Redmond, Wash. The simulation results depict some exemplary dimensions of the lens structures and relative distances of the VCSEL from the lens and the fiber array and can be used to design transceiver packages to achieve maximum efficiencies.

Figure 4B:
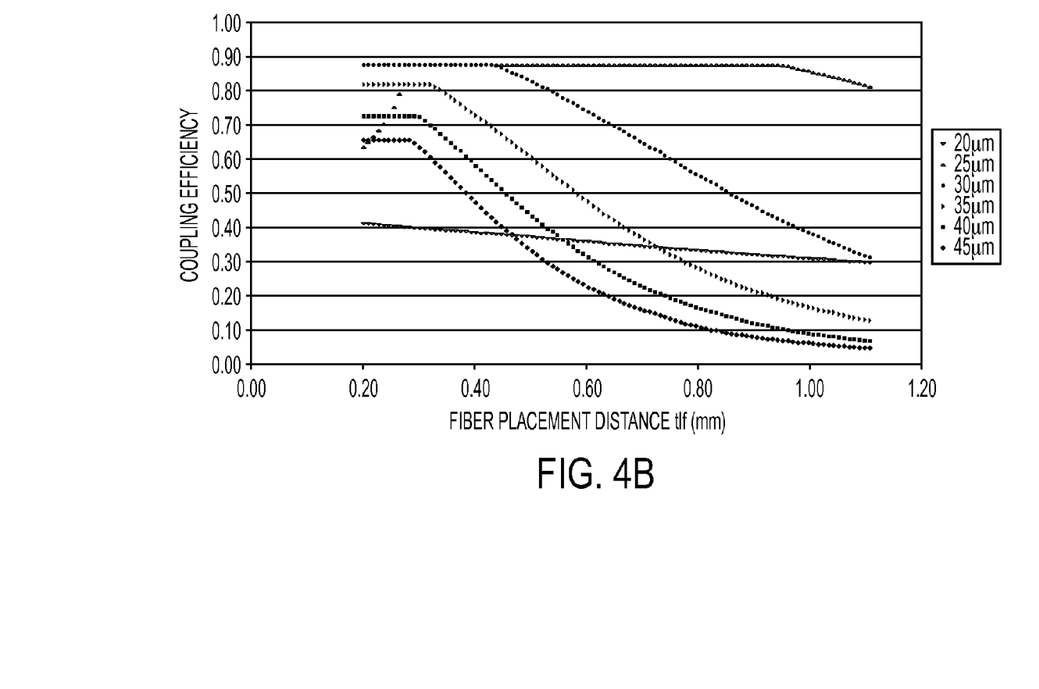

FIG. 4A simulates the coupling of a VCSEL to an optical fiber 412 via a microlens 418a mounted on a glass substrate 418b, that is then mounted on the VCSEL with lens 418a having a diameter d=120 μm and thickness $h_w$=200 μm. Microlens 418a has a thickness $h_l$ varying from 20 to 45 μm. Fiber placement distance $t_{lf}$ varied from 0.2 to 1.1 mm. As seen in FIG. 4B, lens thickness of 25 μm and 30 μm provided the best results (87% coupling, 0.6 dB loss) for VCSEL to fiber coupling.

In FIG. 5A, a discrete lens array structure is aligned to the VCSEL cavity as described and depicted in the context of FIG. 2. FIG. 5B depicts the coupling efficiency on the y-axis as a function of fiber distance from the discrete lens structure in order to achieve maximum coupling efficiency.

Figure 6A:
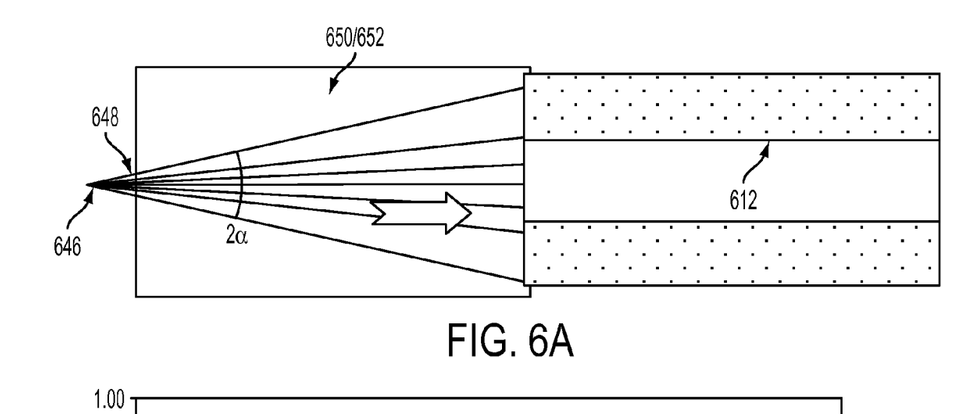
FIGS. 6A and 6B depict the simulated optical coupling performance of direct coupling of an optical fiber with a VCSEL structure.
Figure 6B:
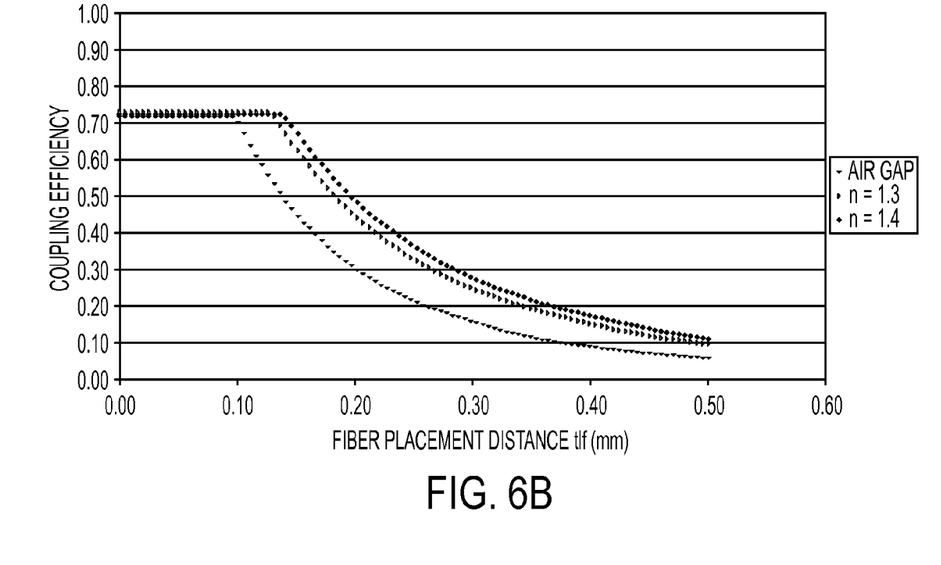

FIG. 6A simulates the direct coupling of a VCSEL to an optical fiber 612. 850 nm light is launched from the VCSEL and is directly collected by a 50/125 multimode fiber 612. The VCSEL has an aperture diameter of 14 μm, a beam divergence half angle of 16° (from virtual point source 646), a fiber placement distance $t_{jf}$ (from VCSEL emitting facet 648) varying from 0 to 0.5 mm. Embodiments having an air gap 650 (n=1) and optical underfills 652 (n=1.3/1.4) between VCSEL and fiber were studied. As can be seen in FIG. 6B, around 70% of the total optical power (1.5 dB loss) from the VCSEL can be coupled into the fiber. Additionally, the use of an optical underfill can enable slightly better coupling efficiency.

Vertical Mounting of PIN Diodes and Other Photosensors

In another aspect of the invention, the principles described herein in the context of VCSEL packages 208, 308 can also be applied to PIN diodes, for example, for use as photosensors. In such embodiments, PIN diodes would replace VCSEL structures 208, 308 and would receive light via optical fiber 212 and produce a current.

Figure 7A:
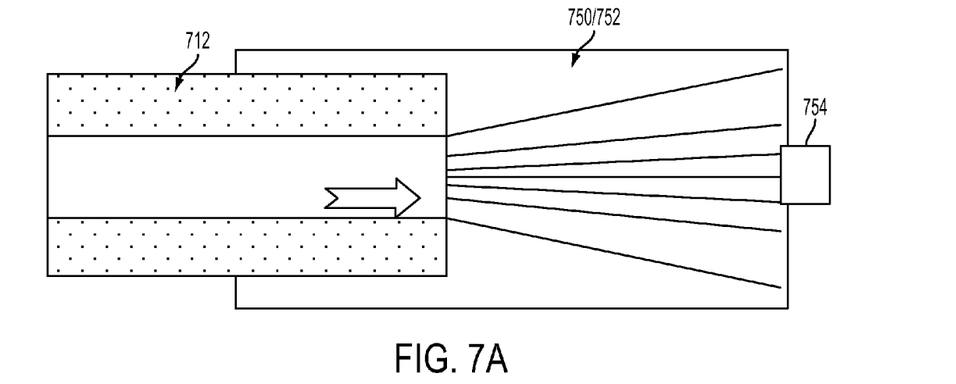
FIGS. 7A and 7B depict the simulated optical coupling performance of a multimode fiber and a PIN diode.
Figure 7B:
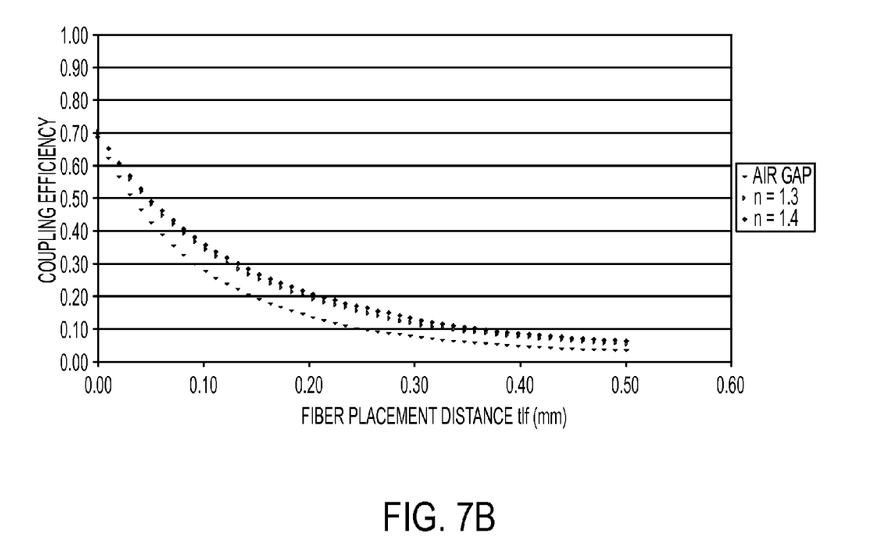

Such an embodiment is simulated in FIG. 7A. Light is launched from a 50/125 multimode fiber and directly collected by a PIN diode 754. In this particular example, the PIN diode 754 has an aperture diameter $d_{pin}$=35 µm and fiber placement distance $t_{jf}$ varying from 0 to 0.5 mm. Embodiments having an air gap 750 (n=1) and optical underfills 752 (n=1.3/1.4) between VCSEL and fiber were studied. As seen in FIG. 7B, around 70% of total optical power (1.5 dB loss) launched from the fiber can be collected by the PIN diode 754 when fiber placement distance $t_{jf}$=0. Insertion loss increases rapidly when fiber placement distance $t_{jf}$ increases. Optical underfill can slightly improve coupling efficiency.

Figure 8A:
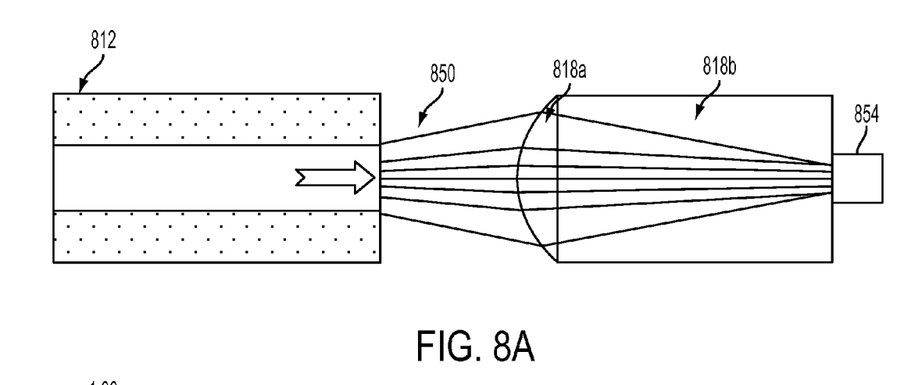
FIGS. 8A and 8B depict the simulated optical coupling performance of a lens array on a glass substrate directly bonded on a PIN diode.
Figure 8B:
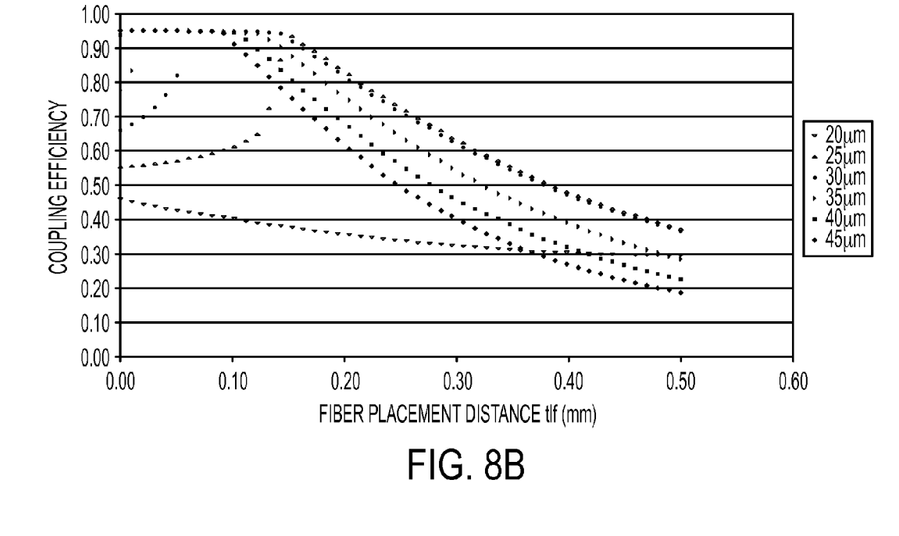

Another embodiment is simulated in FIG. 8A. A glass substrate 818b is directly bonded on PIN diode 854 and has a diameter d=120 µm and thickness $h_w$=200 µm. The PIN diode 854 has an aperture diameter $d_{pin}$=35 µm and fiber placement distance $t_{jf}$ varying from 0 to 0.5 mm. As seen in FIG. 8B, microlenses 818a having a varying thickness $h_l$ of 30 µm and thicker produced the best results, collecting 95% light with 0.2 dB loss.

Advantages of Invention

The aspects and embodiments of the invention described herein have a number of advantages over conventional structures. Generally speaking, aspects of the invention provide highly scalable packaging with reduced material and assembly costs. Additionally, aspects of the invention facilitate automated assembly for higher yield and throughput.

The use of glass substrates 202, 302 is particularly advantageous because glass substrates 202, 302 are widely available in thin panel form without chemical-mechanical planarization and at a low cost (typically between about 0.003 to about 0.005 USD). Glass also has a low dielectric constant and low insertion low, allowing for denser high-speed signal connection. Glass substrates also provide thermal isolation of components for better thermal management. Glass substrates also have similar rigidity and coefficients of thermal expansion as silicon PCBs, resulting in low warpage and low stress packages.

Additionally, embodiments of the invention that place a lens directly on the VCSEL structure and/or directly couple optical fibers to the VCSEL structure reduce tolerance stackups and optical coupling variations and produce low loss, more efficient optical coupling than traditional VCSEL-based packages.

EQUIVALENTS

The functions of several elements may, in alternative embodiments, be carried out by fewer elements, or a single element. While certain embodiments according to the invention have been described, the invention is not limited to just the described embodiments. Various changes and/or modifications can be made to any of the described embodiments without departing from the spirit or scope of the invention. Also, various combinations of elements, steps, features, and/or aspects of the described embodiments are possible and contemplated even if such combinations are not expressly identified herein.

The invention claimed is:

1. An optoelectronics structure comprising:
   a glass substrate defining a trench on a first surface; and
   a VCSEL structure mounted vertically within the trench of the substrate such that the VCSEL structure emits a laser beam substantially parallel to the substrate.

2. The optoelectronics structure of claim 1, further comprising:
   an optical fiber mounted on the substrate substantially coaxial with the laser beam emitted by the VCSEL structure.

3. The optoelectronics structure of claim 2, further comprising:
   a fiber guide positioned between the optical fiber and the substrate.

4. The optoelectronics structure of claim 2, further comprising:
   a lens mounted between and substantially coaxial with a laser-emitting surface of the VCSEL structure and the optical fiber.

5. The optoelectronics structure of claim 1, further comprising:
   a waveguide or lens mounted on a laser-emitting surface of the VCSEL structure.

6. The optoelectronics structure of claim 1, further comprising:
   an electrical connection from the VCSEL structure to a second, opposite surface of the substrate.

7. An optoelectronics structure comprising:
   a glass substrate defining a trench on a first surface; and
   a PIN diode structure mounted vertically within the trench of the substrate such that the PIN diode structure receives a light beam substantially parallel to the substrate.

8. The optoelectronics structure of claim 7, further comprising:
   an optical fiber mounted on the substrate substantially coaxial with the PIN diode structure.

9. The optoelectronics structure of claim 8, further comprising:
   a fiber guide positioned between the optical fiber and the substrate.

10. The optoelectronics structure of claim 8, further comprising:
    a lens mounted between and substantially coaxial with the PIN diode structure and the optical fiber.

11. The optoelectronics structure of claim 8, further comprising: a waveguide or lens mounted on the optical fiber.

12. The optoelectronics structure of claim 7, further comprising:
    an electrical connection from the PIN diode structure to a second, opposite surface of the substrate.

13. The optoelectronics structure of claim 12, further comprising:
    a driver mounted on the second, opposite surface of the substrate and electrically connected to the PIN diode structure through the electrical connection.

14. The optoelectronics structure of claim 12, further comprising:
a transimpedance amplifier (TIA) mounted on the second, opposite surface of the substrate and electrically connected to the PIN diode structure through the electrical connection.

15. The optoelectronics structure of claim 6, further comprising:
a driver mounted on the second, opposite surface of the substrate and electrically connected to the VCSEL structure through the electrical connection.

16. The optoelectronics structure of claim 6, further comprising:
a transimpedance amplifier (TIA) mounted on the second, opposite surface of the substrate and electrically connected to the VCSEL structure through the electrical connection.

\* \* \* \* \*